United States Patent
Jin et al.

(10) Patent No.: US 8,630,649 B2
(45) Date of Patent: Jan. 14, 2014

(54) TERMINAL, METHOD FOR HANDOVER THEREOF AND SUPPORTING METHOD FOR HANDOVER OF BASE STATION

(75) Inventors: Sung-Geun Jin, Daejeon (KR); Sung Cheol Chang, Daejeon (KR); Won-Ik Kim, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 12/608,989

(22) Filed: Oct. 29, 2009

(65) Prior Publication Data

US 2010/0144355 A1   Jun. 10, 2010

(30) Foreign Application Priority Data

Oct. 31, 2008   (KR) .................. 10-2008-0108043
Oct. 12, 2009   (KR) .................. 10-2009-0096762

(51) Int. Cl.
*H04W 36/00*   (2009.01)
*H04B 1/26*   (2006.01)

(52) U.S. Cl.
USPC .................................. 455/444; 370/331

(58) Field of Classification Search
USPC .................. 455/444, 436, 424, 442
See application file for complete search history.

(56) References Cited

U.S. PATENT DOCUMENTS

| | | | |
|---|---|---|---|
| 8,121,089 B2* | 2/2012 | Bao et al. ...................... 370/331 |
| 2008/0051088 A1* | 2/2008 | Tariq et al. .................... 455/436 |
| 2008/0305801 A1* | 12/2008 | Burgess et al. ............... 455/444 |
| 2009/0163206 A1* | 6/2009 | Adatrao et al. ............... 455/436 |

OTHER PUBLICATIONS

Sunggeun Jin et al., Handoff Procedure in the 802.16m Femto Cell Environments, IEEE 802.16 Broadband Wireless Access Working Group, Oct. 31, 2008, IEEE C802.16m-08/1408.

Sunggeun Jin et al., Presentation material for Handoff Procedure in the 802.16m Femto Cell Environments, IEEE 802.16 Broadband Wireless Access Working Group, Oct. 31, 2008; IEEE C802.16m-8/1408.

* cited by examiner

*Primary Examiner* — Michael Faragalla
(74) *Attorney, Agent, or Firm* — Jefferson IP Law, LLP

(57) ABSTRACT

A handover method of a terminal in a macro cell including a plurality of femto cells includes scanning information on a femto base station for managing a femto cell that is near the terminal from among the plurality of femto cells, and reporting information on the femto base station to a macro base station for managing the macro cell.

16 Claims, 3 Drawing Sheets

1

TERMINAL, METHOD FOR HANDOVER THEREOF AND SUPPORTING METHOD FOR HANDOVER OF BASE STATION

BACKGROUND OF THE INVENTION (a) Field of the Invention

The present invention relates to a terminal, a terminal handover method, and a base station handover supporting method.

(b) Description of the Related Art

A terminal performs a handover process when the terminal moves from a cell covered by one base station to another cell controlled by another base station. In this instance, one base station to which the terminal is connected broadcasts a message including information on a neighboring base station so as to support the terminal's handover. The terminal performs a scan process based on information on the neighboring base station and then performs a handover process.

A femto cell represents an area where a wireless communication service is available, for example, an area with a radius of 30 meters. A femto base station for managing the femto cell is installed in an office or a house. A plurality of femto cells may be superimposed in a macro cell for managing a cell that is wider than the femto cell.

SUMMARY OF THE INVENTION

An exemplary embodiment of the present invention efficiently generates and manages a neighboring base station list including femto cell information in order for a terminal to perform a handover process in a condition in which a plurality of femto cells and macro cells are superimposed.

An exemplary embodiment of the present invention provides a handover method of a terminal in a macro cell including a plurality of femto cells, including: scanning information on a femto base station for managing a femto cell that is near the terminal from among the plurality of femto cells; and reporting information on the femto base station to a macro base station for managing the macro cell.

The handover method further includes receiving a neighboring base station list from the macro base station, and the neighboring base station list includes information on a femto base station accessible by the terminal from among the femto base stations for managing a femto cell that is near the terminal.

The plurality of femto cells are divided into a plurality of femto cell groups, and information on the femto base station includes information on the femto cell group including a femto base station accessible by the terminal.

The neighboring base station list further includes position information of the femto base station.

The handover method further includes requesting a scan condition from the macro base station, and receiving the scan condition from the macro base station. The handover method further includes receiving a report condition of information on the femto base station from the macro base station.

The plurality of femto cells are divided into a plurality of femto cell groups, and the handover method further includes extracting a report condition of information on the femto base station by using an identifier for displaying a femto cell group to which the terminal belongs from among a plurality of report conditions broadcast by the macro base station.

The handover method further includes extracting the femto cell information, and performing handover to the femto base station.

The handover method further includes reporting position information of the terminal.

Another embodiment of the present invention provides a handover support method of a macro base station for managing a macro cell including a plurality of femto cells, including: receiving a report of information on a femto base station acquired through scanning by a terminal; generating a neighboring base station list including information on the femto base station accessible by the terminal based on information on the femto base station; and transmitting the neighboring base station list to the terminal.

The handover support method further includes receiving position information of the femto base station from the femto base station, and the neighboring base station list is generated based on position information of the femto base station.

The handover support method includes receiving a request of a scan condition from the terminal, and designating the scan condition to the terminal.

The handover support method further includes designating a report condition to the terminal.

The handover support method further includes reporting position information on the terminal, and the neighboring base station list is generated based on position information of the terminal.

Yet another embodiment of the present invention provides a terminal including: a scanner for scanning information on a femto base station for managing a femto cell; and a transmitter for reporting information on the femto base station to a macro base station for managing a macro cell.

The terminal further includes a receiver for receiving a neighboring base station list from the macro base station.

The neighboring base station list includes information on a femto base station accessible by the terminal from among femto base stations for managing femto cells near the terminal.

The terminal further includes an extractor for extracting information on the femto cell needed by the terminal based on the neighboring base station list.

The transmitter requests a scan condition from the macro base station, and the receiver receives the scan condition from the macro base station.

The receiver receives a condition for reporting information on the femto base station to the macro base station from the macro base station.

DETAILED DESCRIPTION OF THE EMBODIMENTS

Figure 1:
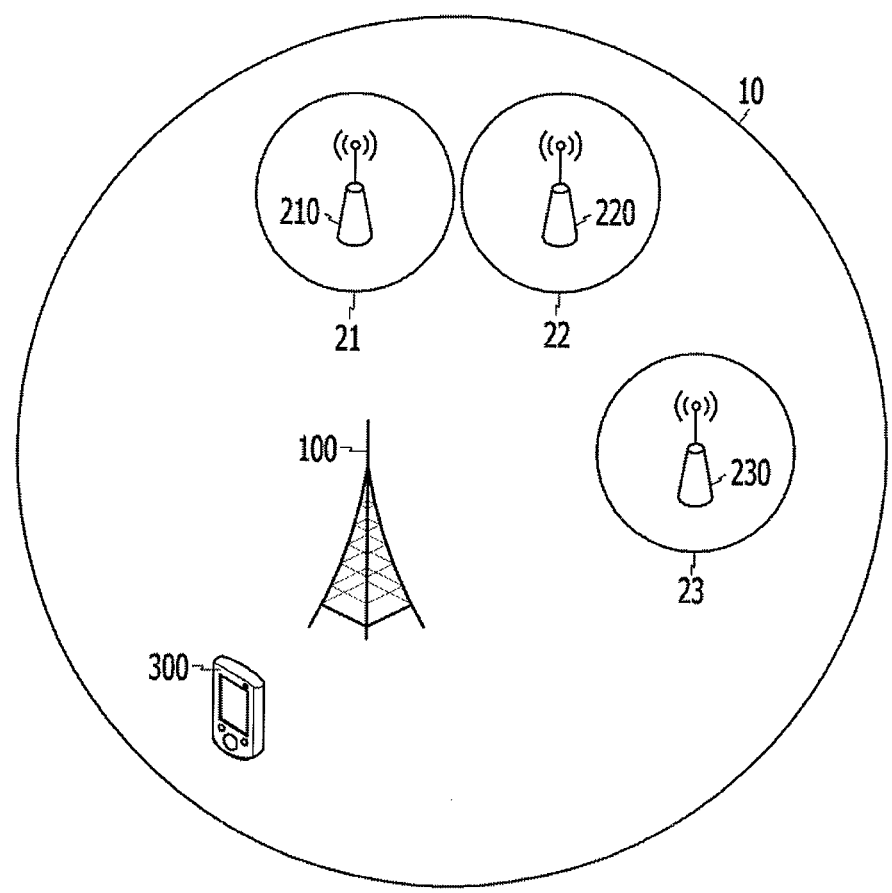
FIG. 1 shows a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station (MS), the mobile terminal, the subscriber station, the portable subscriber station, the user equipment, and the access terminal.

In the specification, a base station (BS) may indicate an access point (AP), a radio access station (RAS), a nodeB (Node-B), an evolved Node-B (eNB), a base transceiver station (BTS), and a mobile multihop relay (MMR)-BS, and it may include entire or partial functions of the access point, the radio access station, the nodeB, the evolved Node-B, the base transceiver station, and the mobile multihop relay-BS.

A terminal, a terminal's handover method, and a base station's handover supporting method according to an exemplary embodiment of the present invention will now be described with reference to accompanying drawings.

FIG. 1 shows a wireless communication system according to an exemplary embodiment of the present invention.

Referring to FIG. 1, the wireless communication system includes a macro base station 100, a plurality of femto base stations 210, 220, and 230, and a terminal 300.

A macro base station 100 manages a macro cell 10. The macro cell 10 includes a plurality of femto cells 21, 22, and 23 managed by the plurality of femto base stations 210, 220, and 230. The macro cell 10 represents a cell that is larger than the femto cell 20, and it is not restricted to the term "macro."

The femto base stations 210, 220, and 230 represent very small base stations for providing a wireless communication service to small areas (e.g., within the radius of 30 meters) and manages the femto cell 20, and for example, they are installed in a blanket area where propagation of other cells is degraded such as a house or a building to acquire quality of the mobile communication service. Here, the femto base stations 210, 220, and 230 and the femto cells 21, 22, and 23 are not restricted to the dictionary definition regarding femto, but include a very small base station and a very small cell that is larger or smaller than the dictionary definition.

The terminal 300 represents the end terminal of a radio channel, and it accesses the femto base stations 210, 220, and 230 or the macro base station 100 to transmit/receive data.

A handover method according to an exemplary embodiment of the present invention will now be described with reference to FIG. 2.

Figure 2:
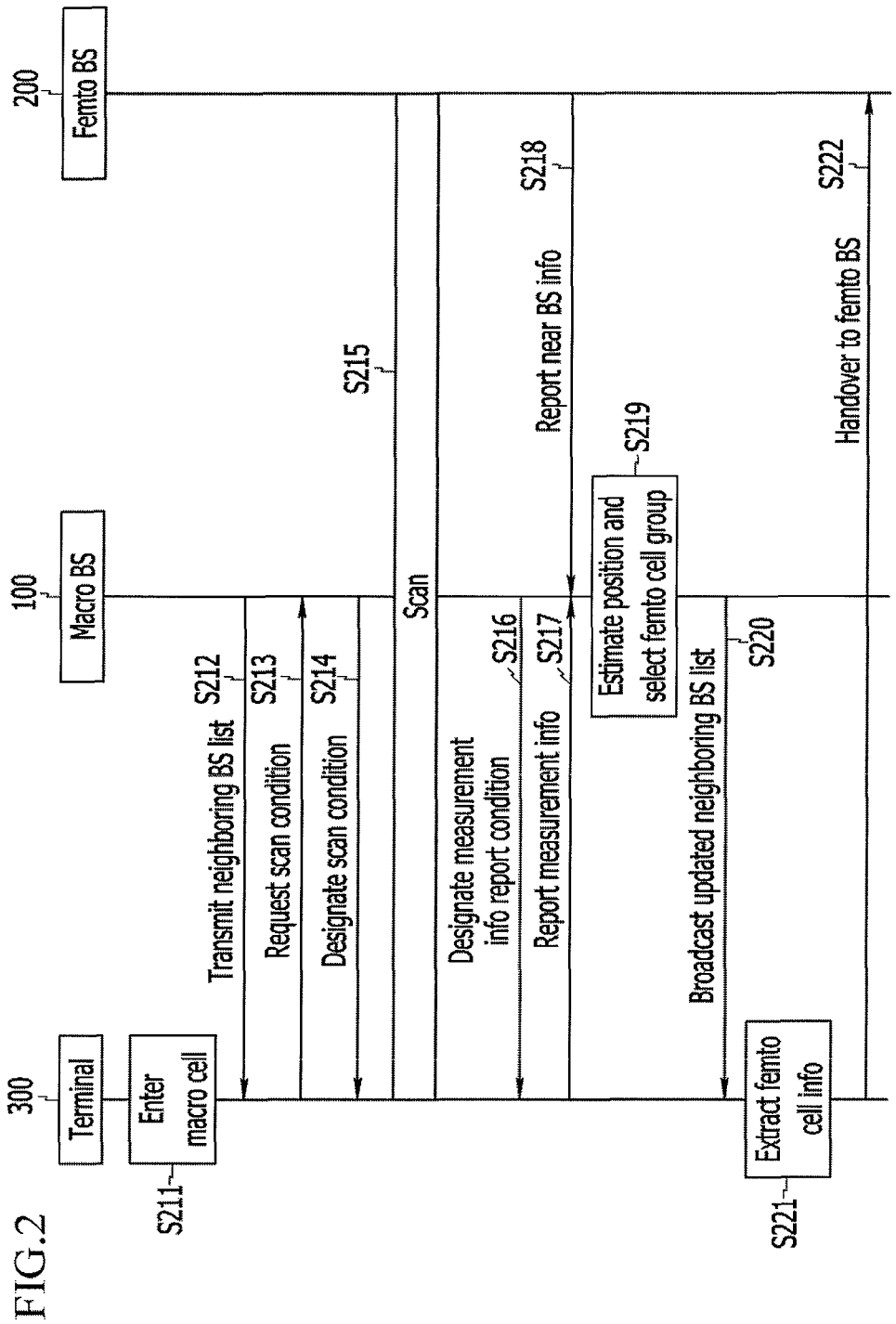
FIG. 2 shows a flowchart of a handover method according to an exemplary embodiment of the present invention.

FIG. 2 shows a flowchart of a handover method according to an exemplary embodiment of the present invention.

Referring to FIG. 2, a new terminal 300 enters the macro cell 10 (S211) when there is no terminal for using the service for the femto cells 21, 22, and 23 in the macro cell 10. The macro base station 100 broadcasts a neighboring base station list to the terminal 300 (S212).

The terminal 300 requests a scan condition from the macro base station 100 (S213). The macro base station 100 designates the scan condition to the terminal 300 having requested the scan condition (S214). Here, the scan condition represents a time and a period for performing a scan process, and the requesting of the scan condition S213 and the designation of the scan condition request S214 can be omitted.

The terminal 300 performs a scan process based on the neighboring base station list broadcast by the macro base station 100 (S215). The terminal 300 acquires measurement information on the neighboring macro base stations through the scan performing process of S215. Here, the measurement information includes information that can influence the handover such as the received signal strength indicator (RSSI), the carrier to noise ratio (CINR), and the signal to interference noise ratio (SINR). When the femto base station 200 is operable by using a different frequency from that of the macro base station 100, the macro base station 100 can divide the terminal 300 into many groups and set the groups to periodically perform the scan process.

The macro base station 100 designates a condition for reporting measurement information to the terminal 300 (S216). The macro base station 100 can inform the terminal 300 of the condition by the terminal's request through unicasting, or can broadcast the condition so that the terminals may receive the same.

The terminal 300 reports the measurement result acquired through the scan process of S215 (S217). In this instance, the terminal 300 can report the measurement result according to the report condition provided by the macro base station 100. When the measurement result is reported according to the report condition as described above, the radio resource required for reporting can be controlled even if the number of terminals 300 is great. The terminal 300 uses a position information acquiring device such as a global positioning system (GPS) to gain position information of the terminal 300 and report the same to the macro base station 100.

Also, the near femto base station 200 transmits signal quality for the near macro cell 10, for example, measurement information such as the RSSI, CINR, and SINR to the macro base station 100 through a cable network (S218). In this instance, the femto base station 200 can transmit position information acquired through the position information acquiring device such as the GPS in addition to the measurement information.

The macro base station 100 uses measurement information provided by the terminal 300 and measurement information and position information provided by the femto base station 200 to estimate a relative position of the neighboring macro base station of the terminal 100 and the femto base station 200 and select a femto cell group that is usable at the estimated position (S219), and includes the selected one in the neighboring base station list to generate an updated neighboring base station list. The femto cell group is generated by dividing a plurality of femto cells 21, 22, and 23 into a plurality of groups.

The macro base station 100 notifies the requested terminal 100 of the updated neighboring base station list through unicasting or broadcasts the same (S220). The macro base station 100 can transmit some of the femto cells 21, 22, and 23 belonging to the femto cell group to the terminal 100 so as to save resource and the scan time of the terminal 300. Unselected femto cells can be transmitted by the macro base station 100 when the terminal 300 requests it or needs it.

The terminal 300 extracts information on the femto cells 21, 22, and 23 needed by the terminal based on the updated neighboring base station list provided by the macro base station 100 (S221). In this instance, the terminal 300 can perform the extraction process S221 by using a femto cell group identifier for displaying the femto cell group.

The terminal 300 hands over to the desired femto base station 200 based on the extracted information on the femto cells 21, 22, and 23 (S222).

The terminal 300 repeats the processes S212 to S221.

When a new terminal 300 enters the macro cell 10 while there is no terminal for using the service for the femto cells 21, 22, and 23, the neighboring base station list broadcast by the macro base station 100 is configured with the list of near macro cells 10, and when the terminal 300 has handed over to one of the femto cells 21, 22, and 23, the neighboring base station list broadcast by the macro base station 100 includes a list of the near macro cell 10 and the femto cells 21, 22, and 23.

In this instance, the terminal 300 uses extracted information on the femto cells 21, 22, and 23 to perform a scan process, and acquires specific information on the neighboring macro base station and femto base station through the scan process.

Also, when the terminal 300 receives a measurement information report condition through broadcasting, the terminal 300 having received the femto cell group identifier in advance uses the femto cell group identifier to extract the measurement result report condition.

By reporting information scanned by the terminal 300 to the macro base station 100 and updating the neighboring base station list by the macro base station 100 based on the report, the neighboring base station list can be efficiently generated and managed in the state in which a plurality of femto cells and macro cells are superimposed.

A terminal according to an exemplary embodiment of the present invention will now be described with reference to FIG. 3.

Figure 3:
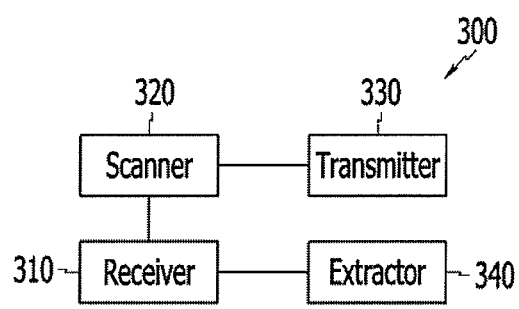
FIG. 3 shows a block diagram of a terminal according to an exemplary embodiment of the present invention.

FIG. 3 shows a block diagram of a terminal according to an exemplary embodiment of the present invention.

Referring to FIG. 3, the terminal 300 includes a receiver 310, a scanner 320, a transmitter 330, and an extractor 340.

The receiver 310 receives the neighboring base station list, scan condition, measurement information report condition, and updated neighboring base station list from the macro base station 100, and receives a signal for the handover process from the macro base station 100 or the femto base station 200. Here, the neighboring base station list includes information on the femto cell group that is usable by the terminal 300.

The scanner 320 performs scanning according to the scan condition based on the neighboring base station list received by the receiver 310 to acquire measurement information including the RSSI, CINR, and SINR for the neighboring macro base stations.

The transmitter 330 requests a scan condition from the macro base station 100, and reports the measurement condition acquired by the scanner 320 to the macro base station 100 according to the measurement information report condition received by the receiver 310.

The extractor 340 extracts information on the femto cell needed by the terminal 300 based on the updated neighboring base station list received by the receiver 310.

According to the present invention, it is possible to efficiently generate and manage a neighboring base station list including femto cell information in order for a terminal to perform a handover process in a condition in which a plurality of femto cells and macro cells are superimposed.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A handover method of a terminal in a macro cell comprising a plurality of femto cells, the method comprising:
   scanning, by the terminal, during a scan condition comprising a time for performing a scan process, information on a femto base station for managing a femto cell that is near the terminal from among the plurality of femto cells;
   reporting, by the terminal, the information on the femto base station to a macro base station for managing the macro cell; and
   receiving, by the terminal, a neighboring base station list from the macro base station,
   wherein the plurality of femto cells are divided into a plurality of femto cell groups, each of the femto cell groups including at least two femto cells, and
   the neighboring base station list comprises information on a femto cell group including a femto base station accessible by the terminal from among the femto base stations for managing the femto cell that is near the terminal.

2. The handover method of claim 1, wherein
   the neighboring base station list further comprises position information of the femto base station.

3. The handover method of claim 1, further comprising:
   requesting, by the terminal, the scan condition from the macro base station; and
   receiving, by the terminal, the scan condition from the macro base station.

4. The handover method of claim 1, further including
   receiving, by the terminal, a report condition of information on the femto base station from the macro base station.

5. The handover method of claim 4, wherein
   the handover method further comprises extracting the report condition of information on the femto base station by using an identifier for displaying a femto cell group to which the terminal belongs from among a plurality of report conditions broadcast by the macro base station.

6. The handover method of claim 1, further comprising:
   extracting, by the terminal, the femto cell information; and
   performing handover to the femto base station.

7. The handover method of claim 1, further comprising
   reporting, by the terminal, position information of the terminal.

8. A handover support method of a macro base station for managing a macro cell comprising a plurality of femto cells, the method comprising:
   receiving, by the macro base station, a report of information on a femto base station acquired through scanning by a terminal during a scan condition comprising a time for performing a scan process;
   generating, by the macro base station, a neighboring base station list based on the information on the femto base station; and
   transmitting, by the macro base station, the neighboring base station list to the terminal,
   wherein the plurality of femto cells are divided into a plurality of femto cell groups, each of the femto cell groups including at least two femto cells, and
   the neighboring base stations list includes information on a femto cell group including a femto base station accessible by the terminal from among the femto base stations for managing a femto cell that is near the terminal.

9. The method of claim 8, further comprising
   receiving, by the macro base station, position information of the femto base station from the femto base station, wherein the neighboring base station list is generated based on the position information of the femto base station.

10. The method of claim 8, wherein the method comprises:
receiving, by the macro base station, a request of a scan condition from the terminal; and
designating, by the macro base station, the scan condition to the terminal.

11. The method of claim 8, further comprising
designating, by the macro base station, a report condition to the terminal.

12. The method of claim 8, further comprising
reporting, by the macro base station, position information on the terminal, wherein
the neighboring base station list is generated based on the position information of the terminal.

13. A terminal comprising:
a scanner for scanning information, during a scan condition comprising a time for performing a scan process, on a femto base station for managing a femto cell;
a transmitter for reporting the information on the femto base station to a macro base station for managing a macro cell comprising a plurality of femto cells; and
a receiver for receiving a neighboring base station list from the macro base station,
wherein the plurality of femto cells are divided into a plurality of femto cell groups, each of the femto cell groups including at least two femto cells, and
the neighboring base station list comprises information on a femto cell group including a femto base station accessible by the terminal from among the femto base stations for managing a femto cell that is near the terminal.

14. The terminal of claim 13, further comprising
an extractor for extracting information on the femto cell needed by the terminal based on the neighboring base station list.

15. The terminal of claim 13, wherein
the transmitter requests the scan condition from the macro base station, and the receiver receives the scan condition from the macro base station.

16. The terminal of claim 13, wherein
the receiver receives a condition for reporting information on the femto base station to the macro base station from the macro base station.

\* \* \* \* \*